United States Patent Office 3,511,748
Patented May 12, 1970

3,511,748
DECORATIVE LAMINATE HAVING SUPERIOR FIRE RETARDANT PROPERTIES
Albert Joseph Heeb and Edward Langworthy Chalmers II, Cincinnati, Ohio, assignors to Formica Corporation, Cincinnati, Ohio, a corporation of Delaware
No Drawing. Filed June 27, 1967, Ser. No. 649,092
Int. Cl. B32b 13/12, 15/08, 27/42
U.S. Cl. 161—165                 8 Claims

ABSTRACT OF THE DISCLOSURE

A decorative laminate having superior fire retardant properties comprising the heat and pressure consolidated unitary structure having the following laminae in the order of ascending superimposed relationship: (A) a cement-asbestos board having a thickness variation not exceeding about 0.005" coated on at least one broad face thereof with a low molecular weight thermosetting phenol-formaldehyde resin, (B) an aluminum foil coated with an adhesive which adheres to said foil and is compatible with and adherable to the phenolic resin on said cement-asbestos board, (C) a subjacent paper sheet impregnated with a thermosetting melamine-formaldehyde resin, (D) a decorative sheet impregnated with a thermosetting melamine-formaldehyde resin and (E) a surface film of a polymer of an allyl ester of a phthalic acid, wherein all of the thermosetting resins in the laminae set forth hereinabove are converted to the thermoset state during consolidation to the unitary structure.

BACKGROUND OF THE INVENTION

Decorative laminates have been produced commercially for a significant number of years in which a decorative sheet of paper is impregnated with a noble resin, i.e., a resin which undergoes no significant darkening upon the application of heat and pressure in the laminating procedure, which decorative sheet is combined with other laminae that are also impregnated with thermosetting resins and the entire assembly heat and pressure consolidated to a unitary structure. Various modifications of this particular structure can optionally be accomplished, such as by the use of an overlay sheet positioned over the decorative sheet when the decorative sheet is a print sheet, which overlay sheet is a sheet of fine paper, such as alpha-cellulose impregnated with a noble resin and which overlay sheet becomes transparent in the course of the laminating operation thereby permitting the print sheet to be seen through the overlay sheet while providing protection against abrasion and other deteriorating wear. It has also been known to make use of a metal foil such as an aluminum foil directly below the decorative sheet and above the core sheets for the purpose of imparting cigarette burn resistance to the decorative laminate particularly when said laminate will be used as a table top or counter top where there is a likelihood that a burning cigarette would drop accidentally from an ashtray and in absence of the metal foil, a burning of the laminate would take place. The metal foil dissipates the heat from the burning cigarette over a much wider area and by so distributing the heat, the burning or scorching is substantially eliminated. Decorative laminates have also been produced for use as vertical wall panels in buildings such as homes, office buildings, hospitals, and the like. In these vertical panels, the risk of cigarette burns is virtually negligible, but the risk of fire hazard is not negligible but instead is rather significant. It is, therefore, highly desirable to have a panel which has fire hazard characteristics that will provide a flame spread of less than 15, fuel contributed less than 15 and smoke developed less than 15 as defined in each instance hereinbelow. In addition, the good surface properties and appearance of high pressure laminated plastics are needed to be maintained for these vertical panels.

FIELD OF THE INVENTION

The present invention is in the field of decorative laminates having superior fire retardant properties comprising the heat and pressure consolidated unitary structure of a plurality of laminae.

DESCRIPTION OF THE PRIOR ART

The instant applicants are aware of a plurality of prior art references, including the U.S. Pats. 2,977,272 and 3,313,675 as well as 2,306,295.

SUMMARY OF THE INVENTION

This invention relates to a decorative laminate having superior fire retardant properties comprising the heat and pressure consolidated unitary structure having a plurality of laminae arranged in superimposed relationship. The base material upon which the essential remaining layers are superimposed is a cement-asbestos board of which a plurality are available commercially from a plurality of sources. The cement-asbestos board is available in a plurality of thicknesses varying between about ⅛", 3/16", ¼" and ⅜". Specifications for such boards are included in the 1961 book of A.S.T.M. Standards, part 5, beginning at pages 1 and 5. The cement-asbestos board product is therein described as being composed of a combination of asbestos fibers and Portland cement with or without the addition of curing agents, water-repellent substances, other mineral fillers, coatings, pigments, or mineral granules. The product is formed under pressure and cured. The boards or sheets are ordinarily essentially free of organic fiber. Numerous patents relating to the methods of manufacturing or improvements in the cement-asbestos board have been issued, e.g., U.S. 2,446,762; 2,446,990 and 2,732,296, among others. Because of the composition of the cement-asbestos board, it has been found in the past to be a substrate onto which thermosetting resin-impregnated fibrous sheet materials were bonded only with great difficulty and with no appreciable measure of permanence. The surface of the cement-asbestos board, as received from the manufacturers, if examined microscopically from an elevational view would exhibit a substantial plurality of protuberances and valleys. For the purpose of the present invention, these protuberances and valleys must be eliminated. As a consequence, the cement-asbestos board as received from the commercial sources must be rendered very smooth so as to provide a maximum thickness variation of not more than about 0.005". Since the cement-asbestos board is relatively incompressible, it is necessary to sand the broad surfaces of the sheet so as not to exceed the required maximum thickness variation in order to insure uniform pressure distribution during the laminating step. When the cement-asbestos board has been treated in order to provide said maximum thickness variation, at least one, and preferably both, of the broad faces of the sheet are coated with a phenolic priming resin of comparatively low molecular weight. This phenolic resin is prepared by reacting phenol and formaldehyde in the presence of an alkaline material such as ammonia to the methylol stage or beyond. These phenolic resins are thermosetting and will be converted under the laminating conditions to the thermoset state. As applied to the cement-asbestos board from an alcohol medium, the resinous material is absorbed somewhat into the upper portion of the board so as to provide ultimately a good bond with the subsequently applied resin on the aluminum foil. Cement-asbestos board will sometimes be referred to hereinbelow as CAB for the sake of brevity. A typically commercially available phenolic resin that is particularly suitable for use as the priming resin is the one that has the following properties:

ASTM solids at 135° C.—60–62%
pH at 25° C.—8.3–8.5
Specific gravity at 25° C.—1.092–1.102
Brookfield viscosity (No. 2 spindle at 20 r.p.m.)—150–200 cps.
Gel time (Sunshine Gel Meter at 136° C.)—10.5–12.5 min.

The resin thus acquired from a commercial source is preferably further reduced with an aliphatic monohydric alcohol, such as ethanol, to a solids content of about 40%±2% solids. It is preferred that the amount of the phenolic priming resin used on the surface of the cement-asbestos board be applied in such a way as to provide from 4 to 8 grams/ft.$^2$ per side in the dried state. One may use from about 2 to approximately 10 grams/ft.$^2$ per side (dry) depending upon the density and moisture content of the cement-asbestos board. Amounts greater than 10 grams/ft.$^2$ per side could be used, but such amounts would be superfluous for adhesion purposes and may increase flammability of the product. The priming resin solids content can be varied from approximately 35% to about 70%, by weight, resin solids based on the total weight of solution but as indicated hereinabove, it is preferred to use between about 38% and 42%, by weight, same basis.

The layer which is superimposed above the cement-asbestos board and which later becomes bonded directly to the cement-asbestos board is an etched aluminum foil which is a commercially available material sold by the manufacturer in the etched condition. This aluminum foil is deeply etched so that interstices in the surface will fill with resin during laminating thereby causing a mechanical bond. Prior to use, the aluminum foil is coated with any suitable adhesive, such as a phenolic resin of the same type used in surfacing the cement-asbestos board or a different phenolic resin. In place of the deeply etched and coated foil, a solvent cleaned aluminum foil, coated on both sides with a suitable resin may be used. The resin can be polyvinyl butyral resin which has been known to be used or bonding metal foils to other substrates. The polyvinyl butyral resin is adherable to the foil, is compatible with and adherable to the phenolic resin in the cement-asbestos board, and is compatible with and adherable to the melamine resin in the subjacent sheet which is superimposed above the aluminum foil. The thickness of the aluminum foil is not critical and may be varied from about 1 mil to about 5 mils, but since handleability dictates a thickness of about 2.5 mils, such foils will generally be used. The amount of adhesive applied to the aluminum foil will generally be in the range of 4 grams/ft.$^2$ to about 6 grams/ft.$^2$ and preferably, about 5 grams/ft.$^2$ (dried resin). The phenolic resin used to coat the aluminum foil should be advanced during the drying step to a B-stage.

Immediately above the aluminum foil there is positioned a paper sheet which is identified as the subjacent layer and it is used to give additional opacity to light colored decorative sheets especially when these decorative sheets are approximately 65 lbs., basis weight. The subjacent sheet provides a further contribution to the laminated structure in that it contributes a cushioning effect which helps to distribute more evenly the pressure during the laminating operation. When the surface sheet is a light solid color or a light print, it is imperative that the subjacent layer be used in order to provide the opacity referred to hereinabove as well as the cushioning effect. For darker colors, the added opacity is not needed, but the cushioning effect is. The subjacent sheet can be eliminated when darker colored decorative laminates are being made in accordance with the present invention, but only if the decorative sheet has a minimum basis weight of 90 lbs. The subadjacent sheet may be a 43 lb. basis weight paper impregnated with 45% of a thermosetting melamine-formaldehyde resin wherein said percentage is, by weight, based on the total weight of the dry impregnated paper.

The decorative paper sheet may be a solid color, such as white or any of the pastels, such as pink, light yellow, and the like, or it may be a printed sheet carrying a geometrical design or a floral pattern or a wood print such as pine, maple, oak, mahogany, walnut, and the like. The decorative paper sheet is generally a high quality α-cellulose paper and may be used in the form of a 65 lb. basis weight sheet impregnated with a thermo-setting melamine-formaldehyde resin to a 45% resin content wherein said percent, by weight, is based on the total weight of the impregnated sheet.

Superimposed above and in contact with the decorative sheet is a film of a polymer of a di-ester of an allyl alcohol and a phthalic acid. As applied to the decorative fibrous sheet, this polymeric allyl phthalate di-ester may be used in solution with the corresponding monomeric di-ester.

After the decorative fibrous sheet has been impregnated with the melamine-formaldehyde resin and dried, it is then immediately available for the coating of the decorative surface only with a solution of a mixture of a polymeric ester of an allyl alcohol and a phthalic acid and a monomeric ester of an allyl alcohol and a phthalic acid. In the monomer state, these esters are di-esters and substantially each of the carboxyl groups of the selected phthalic acid is esterified with an allyl alcohol. Thereafter, conventional polymerization is achieved thereby converting the monomeric diallyl ester of a phthalic acid to a solution of polydiallyl ester of a phthalic acid dissolved in residual monomer of an allyl ester of phthalic acid. In preparing such a monomeric material such allyl alcohols may be used as allyl alcohol, methallyl alcohol, ethallyl alcohol, and the like. Among the phthalic acids which may be used to form the monomeric di-ester are phthalic acid per se, sometimes identified more precisely as orthophthalic acid, isophthalic acid (the meta form) and terephthalic acid (the para form). Additionally, one can make use of the tetrahydrophthalic acid, the hexahydrophthalic acid and the halosubstituted phthalic acids, such as the tetrachlorophthalic acid, and the like.

In preparing the allyl ester monomers, one can either start with the phthalic acids per se or the anhydrides thereof whenever available. It is preferred to use the polymer of the diallyl ester of orthophthalic acid as the coating material for the impregnated paper web where such treated fibrous sheet is to be used in a decorative laminate designed for indoor vertical surfaces such as walls within the confines of a building. Whenever the decorative fibrous sheets of the present invention are to be used in the preparation of a decorative laminate for use in vertical outdoor applications where such laminates will be exposed to the extremes of temperature and humidity, it is preferred to make use, as the coating polymer, the polymer of the diallyl ester of the hexahydroorthophthalic acid or anhydride.

A plurality of processes are known and have been published for the preparation of these polymers of diallyl phthalates. To illustrate the process for preparing such polymers, attention is directed to the U.S. Pats. 2,990,388, 3,131,088, 3,154,454 and 3,200,008, each of which is incorporated herein by reference. Still further, these polymeric esters are commercially available from a plurality of sources. The concept of applying this film of a polymer of an allyl ester of a phthalic acid is disclosed in the U.S. application Ser. No. 552,399, filed May 24, 1966, now abandoned. To the extent required, said pending application is incorporated herein by reference.

In order to coat the surface of the decorative sheet with a surface film of a polymer of an allyl ester of a phthalic acid, the polymer solution may be applied in a reverse roll coating technique in order to impart a surface film or layer to the melamine resin decorative sheet in certain solids content in order to insure that the polymeric ester is deposited primarily and almost exclusively on the surface only of the impregnated web which is then heated at the required temperature in order to reduce the non-polymeric volatiles, below about 5%, by weight, based on the total weight of the coated impregnated sheet. To accomplish this end, the polymer in solution should be in such an amount that the polymer solids content is varied between about 50% and about 67%, by weight, based on the total weight of the polymer solution. If the allyl polymer composition is used in a neat solution (no viscosity builders) the solids content is controlled between about 57% and 67%, by weight, based on the total weight of the polymer solution. However, when using a viscosity builder such as a finely-divided silicon dioxide, the total solids of polymer and viscosity builder may be varied between about 53% and 58%, by weight, based on the total weight of solution. In this latter instance, the diallyl phthalate solids alone is varied between about 50% and 54%, by weight, based on the total weight of solution containing the viscosity builder. The amount of viscosity builder can, therefore, be varied between about 0% and 7%, by weight, based on the weight of the polymer solids. It is still further required that the specific gravity of the treating polyester solution be controlled within the range of from about 1.01 to 1.06. As used, the solution will contain the above-stated percentages of polymer solids and the remaining portion will be made up primarily of a relatively minor amount of monomer and the dispersion medium for the polymer solids will be an inert organic solvent of which a plurality are known to exist that dissolve these allyl ester polymers. Illustrative of such solvents are low molecular weight ketones such as acetone, methyl ethyl ketone, diethyl ketone, and the like. Aromatic solvents such as benzene, toluene, xylene, and the like, may also be used as well as ester solvents such as methyl acetate, ethyl acetate, and the like. Mixtures of these solvents not only may be used but sometimes are preferably used, such as a mixture of a preponderant amount of methyl ethyl ketone and a minor amount of toluene. The thickness of the wet film as applied to the melamine-formaldehyde resin impregnated fibrous web may be varied between about 0.003 inch and 0.015 inch. Preferably, the wet film thickness is varied between about 0.005 inch and about 0.008 inch. After the coating operation is completed and the coated web dried, the film thickness will generally vary between about 0.002 inch and 0.010 inch and, preferably, between about 0.002 inch and 0.003 inch. There is consequently a close relationship between the amount of polymer solids in solution and the viscosity of the solution. This viscosity measurement, however, will vary depending on the type of solvent used as the solvent medium, and the polymeric ester material. It is sometimes desirable to build up the viscosity of a given polymer solution where it contains the right measure of polymer solids and the correct specific gravity but wherein the viscosity is too low for commercially acceptable deposition of the film onto the melamine-formaldehyde resin impregnated fibrous web. This can be accomplished by adding to the solution materials which are known to impart viscosity build-up to a solution such as silica aerogel and the like. For best commercial operations, it is, therefore, desirable to make use of a polymer solution of a viscosity of from about 400 to about 1600 centipoises when measured at 25° C.

Laminates produced by the process of the present invention have low fire hazard characteristics and at the same time have pleasing, durable wood grain or other printed, patterned or solid colored surfaces. The laminates of the prior art either provide surfaces with good appearance and other good surface properties but present much greater fire hazards while those with a low fire hazard do not have the above-mentioned surface properties. Fire hazard is traditionally evaluated by measuring the flame spread, fuel contribution and smoke developed during the ASTM E-84 25 ft. tunnel test. Cement-asbestos board, a generally recognized incombustible material, is rated at 0 flame spread, (FS), 0 fuel contributed (FC) and 0 smoke developed (SD). On the other hand, red oak flooring has a rating of 100 FS, 100 FC, and 100 SD. Conventional laminated plastic sheets applied to cement-asbestos board having all of the desirable surface properties and appearances have the following range of fire hazard values, FS–15–30, FC–0–15, and SD–5–250.

In order that the concept of the present invention may be more completely understood, the following examples are set forth in which all parts are parts, by weight, unless otherwise indicated. These examples are set forth primarily for the purpose of illustration and any specific enumeration of detail contained therein should not be interpreted as a limitation on the case except as is indicated in the appended claims.

Example 1

A sheet of ¼" cement-asbestos board is sanded to give flat parallel faces having a thickness variation not exceeding about 0.005" is given a prime coating of a low molecular weight thermosetting phenol-formaldehyde resin as described in detail hereinabove. The prime coat penetrates into the cement-asbestos board and is dried so as to drive off the alcohol medium carrier for the resin. Superimposed above the cement-asbestos board is an etched aluminum foil, 2.5 mils thick, which foil is coated on its underside with a phenol-formaldehyde thermosetting resin dried and B-staged and which coated side is then placed directly in contact with the primed cement-asbestos board. On top of the aluminum foil there is positioned a subjacent paper sheet impregnated with a thermosetting melamine-formaldehyde resin. On top of the subjacent sheet there is directly applied a wood grain paper sheet impregnated with a thermosetting melamine-formaldehyde resin. On the surface of the decorative sheet there is then coated a film or layer of polydiallyl phthalate in a 2 mil thick film. The above assembly is then inserted into a press and subjected to 300 p.s.i. at 140° C. for 15 minutes. The resulting panel had the following fire hazard evaluations: FS–8, FS–0, SD–0. The low fire hazard rating of this laminate is attributed to the incombustibility of the cement-asbestos board core. However, the surfacing layer is kept very thin so that little material is present to burn.

Example 2

Example 1 is repeated in all essential details except that the surface film used is the polymer of the di-ester of allyl alcohol and tetrachlorophthalic anhydride otherwise referred to a poly(allyltetrachlorophthalate). The properties of this laminate from a fire hazard standpoint were equal to those of that laminate of Example 1 except that the FS was below 8.

Example 3

Example 1 is repeated in all essential details except that on the underside of the cement-asbestos board there is positioned two backing sheets which are 45 lb. basis weight paper impregnated with 45% melamine-formaldehyde resin solids B-staged. The laminate thus produced has fire hazard properties substantially identical with those of Example 1 and in addition the panel is balanced so as to prevent warpage.

Example 4

Example 2 is repeated in all essential details except that the backing sheets as used in Example 3 were applied. A laminate having properties intermediately comparable to those of Examples 2 and 3 were achieved.

Example 5

Example 1 is repeated in all essential details except that in place of the polydiallyl phthalate there is used poly-(diallylhexahydrophthalate).

Example 6

Example 5 is repeated in all essential details except that the backing sheets as used in Example 3 are applied.

We claim:

1. A decorative laminate having superior fire retardant properties comprising the heat and pressure consolidated unitary structure having the following laminae in the order of ascending superimposed relationship:
   (A) a cement-asbestos board having a thickness variation not exceeding about 0.005" coated on at least one broad face thereof with a low molecular weight thermosetting phenolformaldehyde resin,
   (B) an etched aluminum foil coated with an adhesive which adheres to said foil and is compatible with and adherable to the phenolic resin on said cement-asbestos board,
   (C) a subjacent paper sheet impregnated with a thermosetting melamine-formaldehyde resin,
   (D) a decorative sheet impregnated with a thermosetting melamine-formaldehyde resin and
   (E) a surface film of a polmer of an allyl ester of a phthalic acid,
wherein all of the thermosetting resins in the laminae set forth hereinabove are converted to the thermoset state during consolidation to the unitary structure.

2. The laminate according to claim 1 in which the cement-asbestos board is coated on both sides with said phenolic resin and the underside of said board carries at least one melamine-formaldehyde resin impregnated paper bonded thereto as a backing sheet.

3. The laminate according to claim 1 in which (E) is poly(diallylphthalate).

4. The laminate according to claim 1 in which (E) is the polymer of the di-ester of allyl alcohol and tetrachlorophthalic anhydride.

5. The laminate according to claim 1 in which the cement-asbestos board is coated on both sides with said phenolic resin and the underside of said board carries at least one melamine-formaldehyde resin impregnated paper bonded thereto as a backing sheet and in which (E) is poly(diallylphthalate).

6. The laminate according to claim 1 in which the cement-asbestos board is coated on both sides with said phenolic resin and the underside of said board carries at least one melamine-formaldehyde resin impregnated paper bonded thereto as a backing sheet and in which (E) is the polymer of the di-ester of allyl alcohol and tetrachlorophthalic anhydride.

7. The laminate according to claim 1 in which (E) is poly(diallylhexahydrophthalate).

8. The laminate according to claim 1 in which the cement-asbestos board is coated on both sides with said phenolic resin and the underside of said board carries at least one melamine-formaldehyde resin impregnated paper bonded thereto as a backing sheet and in which (E) is the polymer of the di-ester of allyl alcohol and tetrachlorophthalic anhydride.

References Cited

UNITED STATES PATENTS

| | | | |
|---|---|---|---|
| 2,306,295 | 12/1942 | Casto | 161—165 X |
| 2,563,111 | 8/1951 | Hampson et al. | |
| 3,131,088 | 4/1964 | Festag | 117—161 |
| 3,200,008 | 8/1965 | Holtschmidt et al. | 117—155 |
| 3,294,619 | 12/1966 | Noland | 161—6 X |
| 3,311,520 | 3/1967 | Michaelson et al. | 161—215 X |
| 3,345,248 | 10/1967 | Pounds et al. | 161—413 X |

HAROLD ANSHER, Primary Examiner

R. A. KILLWORTH, Assistant Examiner

U.S. Cl. X.R.

161—205, 215, 248, 258, 263, 403; 117—138.8, 161